United States Patent
Chandrasekaran

(10) Patent No.: US 11,606,732 B1
(45) Date of Patent: Mar. 14, 2023

(54) COVERAGE IMPROVEMENT FOR 5G NEW RADIO WIRELESS COMMUNICATION NETWORK, SUCH AS FOR OVER-SHOOTING CELLS

(71) Applicant: T-Mobile USA, Inc., Bellevue, WA (US)

(72) Inventor: Nirmal Chandrasekaran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/469,418

(22) Filed: Sep. 8, 2021

(51) Int. Cl.
| | |
|---|---|
| *H04W 36/00* | (2009.01) |
| *H04W 64/00* | (2009.01) |
| *H04W 48/16* | (2009.01) |
| *H04W 36/16* | (2009.01) |
| *H04W 52/28* | (2009.01) |
| *H04W 36/32* | (2009.01) |

(52) U.S. Cl.
CPC ... *H04W 36/00835* (2018.08); *H04W 36/165* (2013.01); *H04W 36/32* (2013.01); *H04W 48/16* (2013.01); *H04W 52/283* (2013.01); *H04W 64/003* (2013.01)

(58) Field of Classification Search
CPC ......... H04W 36/00835; H04W 36/165; H04W 36/32; H04W 48/16; H04W 52/283; H04W 64/003
USPC ........................................................ 455/436
See application file for complete search history.

(56) References Cited

U.S. PATENT DOCUMENTS

| | | | |
|---|---|---|---|
| 5,175,867 | A | 12/1992 | Wejke et al. |
| 5,513,246 | A | 4/1996 | Jonsson et al. |
| 5,535,423 | A | 7/1996 | Dupuy |
| 5,850,604 | A | 12/1998 | Dufour et al. |
| 5,924,034 | A | 7/1999 | Dupuy |
| 6,073,010 | A | 6/2000 | Dufour |
| 6,081,713 | A | 6/2000 | Desgagne |
| 6,091,955 | A | 7/2000 | Aalto et al. |
| 6,212,384 | B1 | 4/2001 | Almgren et al. |
| 6,259,918 | B1 | 7/2001 | Labonte et al. |
| 6,321,083 | B1 | 11/2001 | Vaara et al. |
| 6,327,472 | B1 | 12/2001 | Westroos et al. |
| 6,345,186 | B1 | 2/2002 | Schultz et al. |
| 6,477,367 | B1 | 11/2002 | Kim |
| 6,529,734 | B1 | 3/2003 | Lagneborg et al. |
| 6,853,842 | B1 | 2/2005 | Wilson et al. |
| 7,113,782 | B2 | 9/2006 | Lucidarme |

(Continued)

FOREIGN PATENT DOCUMENTS

| | | |
|---|---|---|
| CN | 102870464 A | 1/2013 |
| CN | 106257942 B | 9/2019 |

(Continued)

*Primary Examiner* — Joel Ajayi
(74) *Attorney, Agent, or Firm* — Perkins Coie LLP

(57) ABSTRACT

The described technology provides a system and method for determining, inter alia, if a serving cell in a cellular network is an over-shooter cell serving calls outside an intended or designed coverage area by searching for eligible neighbor cells in a search area bounded by an azimuth of a sector antenna of the serving cell. The serving cell is determined to be an over-shooter cell when, e.g., the distance between the serving cell and mobile devices associated with the calls is larger than the average distance between the serving cell and one or more closest neighbor cells in a list of eligible neighbor cells identified in the search area.

15 Claims, 12 Drawing Sheets

(56) References Cited

U.S. PATENT DOCUMENTS

| | | |
|---|---|---|
| 7,333,441 B2 | 2/2008 | Balletti et al. |
| 7,904,091 B2 | 3/2011 | Neidhardt et al. |
| 8,081,978 B2 | 12/2011 | Pecen et al. |
| 8,112,093 B2 | 2/2012 | Nakamata et al. |
| 8,290,496 B2 | 10/2012 | Segall et al. |
| 8,315,647 B2 | 11/2012 | Soma et al. |
| 8,422,472 B2 | 4/2013 | Mun |
| 8,442,069 B2 | 5/2013 | Ji et al. |
| 8,467,795 B2 | 6/2013 | Li et al. |
| 8,588,759 B2 | 11/2013 | Moe et al. |
| 8,682,310 B2 | 3/2014 | Vikberg et al. |
| 8,750,849 B1 | 6/2014 | Adib et al. |
| 8,903,400 B2 | 12/2014 | Bjorken |
| 8,958,392 B2 | 2/2015 | Yang et al. |
| 8,983,470 B1 | 3/2015 | Ryan et al. |
| 8,995,255 B2 | 3/2015 | Chou et al. |
| 9,002,362 B2 | 4/2015 | Marce et al. |
| 9,060,289 B2 | 6/2015 | Chandrasekhar et al. |
| 9,078,160 B2 | 7/2015 | Faerber et al. |
| 9,191,869 B2 | 11/2015 | Marcum et al. |
| 9,198,069 B2 | 11/2015 | Franklin et al. |
| 9,204,315 B2 | 12/2015 | Sridhar |
| 9,241,293 B2 | 1/2016 | Huang et al. |
| 9,277,410 B2 | 3/2016 | Rodriguez Crespo et al. |
| 9,332,458 B2 | 5/2016 | Nuss et al. |
| 9,363,731 B1 | 6/2016 | Yang et al. |
| 9,420,538 B2 | 8/2016 | Preteseille et al. |
| 9,559,795 B2 | 1/2017 | Björkén et al. |
| 9,578,530 B2 | 2/2017 | Gopalakrishnan et al. |
| 9,584,966 B1 | 2/2017 | Thiel et al. |
| 9,584,995 B2 | 2/2017 | Chuttani et al. |
| 9,615,296 B2 | 4/2017 | Ryan et al. |
| 9,622,192 B2 | 4/2017 | Ji |
| 9,686,729 B2 | 6/2017 | Zingler |
| 9,716,559 B2 | 7/2017 | Chou |
| 9,736,700 B1 | 8/2017 | Douberley et al. |
| 9,763,201 B2 | 9/2017 | Miao et al. |
| 9,775,068 B2 | 9/2017 | Fehske et al. |
| 9,781,685 B2 | 10/2017 | Tsui et al. |
| 9,826,420 B2 | 11/2017 | Tarraf et al. |
| 9,860,814 B2 | 1/2018 | Tejedor et al. |
| 9,930,545 B2 | 3/2018 | Cotanis et al. |
| 10,015,677 B2 | 7/2018 | Chou |
| 10,034,180 B2 | 7/2018 | Hamalainen et al. |
| 10,034,190 B2 | 7/2018 | Lopes et al. |
| 10,039,013 B2 | 7/2018 | Periyasamy et al. |
| 10,098,007 B2 | 10/2018 | Chandrasekaran et al. |
| 10,117,135 B2 | 10/2018 | Tsai |
| 10,123,230 B1 | 11/2018 | Govindassamy |
| 10,194,366 B1 | 1/2019 | Govindassamy |
| 10,244,457 B1 | 3/2019 | Santhanam et al. |
| 10,306,522 B2 | 5/2019 | Yamine |
| 10,321,274 B2 | 6/2019 | Kim et al. |
| 10,334,488 B2 | 6/2019 | Periyasamy et al. |
| 10,368,253 B2 | 7/2019 | Lei et al. |
| 10,448,261 B2 | 10/2019 | Sofuoglu |
| 10,462,715 B2 | 10/2019 | Andersson et al. |
| 10,542,442 B2 | 1/2020 | Johnson |
| 10,582,399 B1 | 3/2020 | Yoon |
| 10,609,587 B2 | 3/2020 | Livschitz et al. |
| 10,652,725 B2 | 5/2020 | Siomina et al. |
| 10,674,371 B2 | 6/2020 | Hopcraft |
| 10,716,085 B2 | 7/2020 | Annamalai et al. |
| 10,841,853 B1 | 11/2020 | Yousefi'zadeh et al. |
| 10,856,223 B2 | 12/2020 | Zhang et al. |
| 10,880,898 B2 | 12/2020 | Bellamkonda et al. |
| 10,893,420 B2 | 1/2021 | Sarkar et al. |
| 11,032,665 B1 | 6/2021 | George et al. |
| 2002/0131387 A1 | 9/2002 | Pitcher et al. |
| 2004/0242158 A1 | 12/2004 | Fattouch et al. |
| 2005/0288017 A1 | 12/2005 | Doumenc et al. |
| 2006/0121906 A1 | 6/2006 | Stephens et al. |
| 2012/0155383 A1 | 6/2012 | Singh et al. |
| 2014/0073304 A1 | 3/2014 | Brisebois et al. |
| 2014/0162682 A1 | 6/2014 | Tafreshi et al. |
| 2014/0274055 A1 | 9/2014 | Sriram et al. |
| 2014/0302853 A1 | 10/2014 | Militano et al. |
| 2016/0029253 A1 | 1/2016 | Sarkar et al. |
| 2016/0135067 A1 | 5/2016 | Morad et al. |
| 2016/0353340 A1 | 12/2016 | Yang et al. |
| 2017/0094563 A1 | 3/2017 | Yang et al. |
| 2017/0201973 A1 | 7/2017 | Yang et al. |
| 2017/0208523 A1 | 7/2017 | Yang et al. |
| 2019/0090246 A1 | 3/2019 | Jagannath et al. |
| 2021/0051530 A1 | 2/2021 | Venkataraman et al. |
| 2021/0092631 A1 | 3/2021 | Tang |
| 2021/0143897 A1 | 5/2021 | Edge |

FOREIGN PATENT DOCUMENTS

| | | |
|---|---|---|
| CN | 111279629 A | 6/2020 |
| CN | 107205236 B | 7/2020 |
| CN | 111373787 A | 7/2020 |
| CN | 109982365 B | 8/2020 |
| CN | 111787581 A | 10/2020 |
| CN | 111885662 A | 11/2020 |
| CN | 111954224 A | 11/2020 |
| CN | 112020094 A | 12/2020 |
| CN | 108810950 B | 2/2021 |
| CN | 112566023 A | 3/2021 |
| CN | 112566100 A | 3/2021 |
| CN | 112585912 A | 3/2021 |
| DE | 19803960 A1 | 8/1998 |
| DE | 102017213999 A1 | 2/2019 |
| EP | 0855123 A1 | 7/1998 |
| EP | 1671508 B1 | 5/2007 |
| EP | 2466946 A1 | 6/2012 |
| EP | 2779745 A1 | 9/2014 |
| EP | 2898342 A2 | 7/2015 |
| JP | 2002530958 A | 9/2002 |
| JP | 2015173495 A | 10/2015 |
| KR | 100546481 B1 | 1/2006 |
| KR | 102072307 B1 | 4/2020 |
| WO | 9315569 A1 | 8/1993 |
| WO | 9634500 A1 | 10/1996 |
| WO | 9815149 A1 | 4/1998 |
| WO | 0051367 A2 | 8/2000 |
| WO | 0051368 A2 | 8/2000 |
| WO | 0165795 A1 | 9/2001 |
| WO | 2014179941 A1 | 11/2014 |
| WO | 2015147707 A1 | 10/2015 |
| WO | 2015180128 A1 | 12/2015 |
| WO | 2015195010 A1 | 12/2015 |
| WO | 2016101808 A1 | 6/2016 |
| WO | 2020073757 A1 | 4/2020 |
| WO | 2021013367 A1 | 1/2021 |
| WO | 2021044375 A1 | 3/2021 |

| cell_name | end_location_lat | end_location_lon | rsrp | rsrq | 5g_nr_serving_cell | 5g_nr_serving_pci | 5g_nr_serving_arfcn | 5g_nr_last_measurement_pci | 5g_nr_last_measurement_arfcn | 5g_nr_rsrp | 5g_nr_rsrq |
|---|---|---|---|---|---|---|---|---|---|---|---|
| LBQ06091C11 | 40.748863 | -73.89381 | -110 | -20 | | | | | | | |
| LBQ06091C11 | 40.749493 | -73.89208 | -90 | -10 | | 130 | 520110 | | | -92 | -11 |
| LBQ06091C11 | 40.74984 | -73.89385 | -91 | -14.5 | | | | | | | |
| LBQ06091C11 | 40.748753 | -73.89279 | -62 | -13 | 3.10E+16 | 130 | 520110 | 130 | | -67 | -11.5 |
| LBQ06091C11 | 40.74884 | -73.89257 | -69 | -10.5 | | | | | | | |
| LBQ06091C11 | 40.75004 | -73.89144 | -75 | -14.5 | | | | | | | |
| LBQ06091C11 | 40.748493 | -73.89298 | -86 | -18 | | | | | | | |
| LBQ06091C11 | 40.749477 | -73.89239 | -90 | -13.5 | | | | | | | |
| LBQ06091C11 | 40.747932 | -73.892166 | -106 | -13 | | | | | | | |
| LBQ06091C11 | 40.74858 | -73.89263 | -100 | -12.5 | | | | | | | |
| LBQ06091C11 | 40.748596 | -73.89268 | -59 | -13 | 3.10E+16 | 130 | 520110 | | | | |
| LBQ06091C11 | 40.74934 | -73.89225 | -75 | -12 | | | | 130 | | | |
| LBQ06091C11 | 40.749523 | -73.892876 | -84 | -11 | | | | | | | |
| LBQ06091C11 | 40.749424 | -73.89264 | -111 | -15 | | | | | | | |

*FIG. 5*

COVERAGE IMPROVEMENT FOR 5G NEW RADIO WIRELESS COMMUNICATION NETWORK, SUCH AS FOR OVER-SHOOTING CELLS

BACKGROUND

A cellular network is distributed over land areas called "cells", each served by at least one fixed-location transceiver (typically three cell sites or base transceiver stations with 120 degree sector antennas). These base stations provide the cell with the network coverage which can be used for transmission of voice, data, and other types of content. In some radio access technologies (RATs), a cell typically uses a different set of frequencies from neighboring cells, to avoid interference and provide guaranteed service quality within each cell. When joined together, these cells provide radio coverage over a wide geographic area. This enables numerous portable transceivers to communicate with each other and with fixed transceivers anywhere in the network even when some of the transceivers are moving through more than one cell during transmission.

A service provider can locate infrastructure equipment (e.g., base stations or cell sites) geographically within a larger area such that the range of wireless communications may have some overlap and may resemble a pattern such as a set of overlapping cells. The geographic area for which individual infrastructure equipment can receive and transmit radio communications to various mobile device is known as the coverage of the individual infrastructure equipment. The quantity of devices or the data throughput that the individual infrastructure equipment can support within its geographic area may be considered the capacity of the individual infrastructure equipment. Within a defined range of individual infrastructure equipment, mobile devices may experience a different quality of radio signal communications according to the amount of power used for radio transmissions by the individual infrastructure equipment, the orientation and capabilities of antennas, the terrain, buildings, interfering signals from other infrastructure equipment or other devices, and various other features that affect radio wave propagation.

To deliver service across a large geographic region, wireless communication service providers may maintain networks of cells with overlapping coverages and capacities. To ensure that the cells adequately cover the intended or designed geographical regions, service providers can perform drive testing to measure and assess the coverage, capacity, and Quality of Service (QoS) of the wireless communication network. Drive testing consists of using a motor vehicle containing mobile radio network air interface measurement equipment that can detect and record a wide variety of physical and virtual parameters of mobile cellular service in a given geographical area. By measuring what a wireless network subscriber would experience in any specific area, wireless carriers can make directed changes to their networks that provide better coverage and service to their customers. Because drive testing is expensive, time consuming, and resource intensive, there exists a need for techniques to allow the service provider to improve the coverage and capacity of wireless communication networks more rapidly and cost-effectively.

BRIEF DESCRIPTION OF THE DRAWINGS

Detailed descriptions of implementations of the present invention will be described and explained through the use of the accompanying drawings.

FIG. 5 is a table that illustrates representative cellular traffic information for automated coverage analysis.

Figure 1:
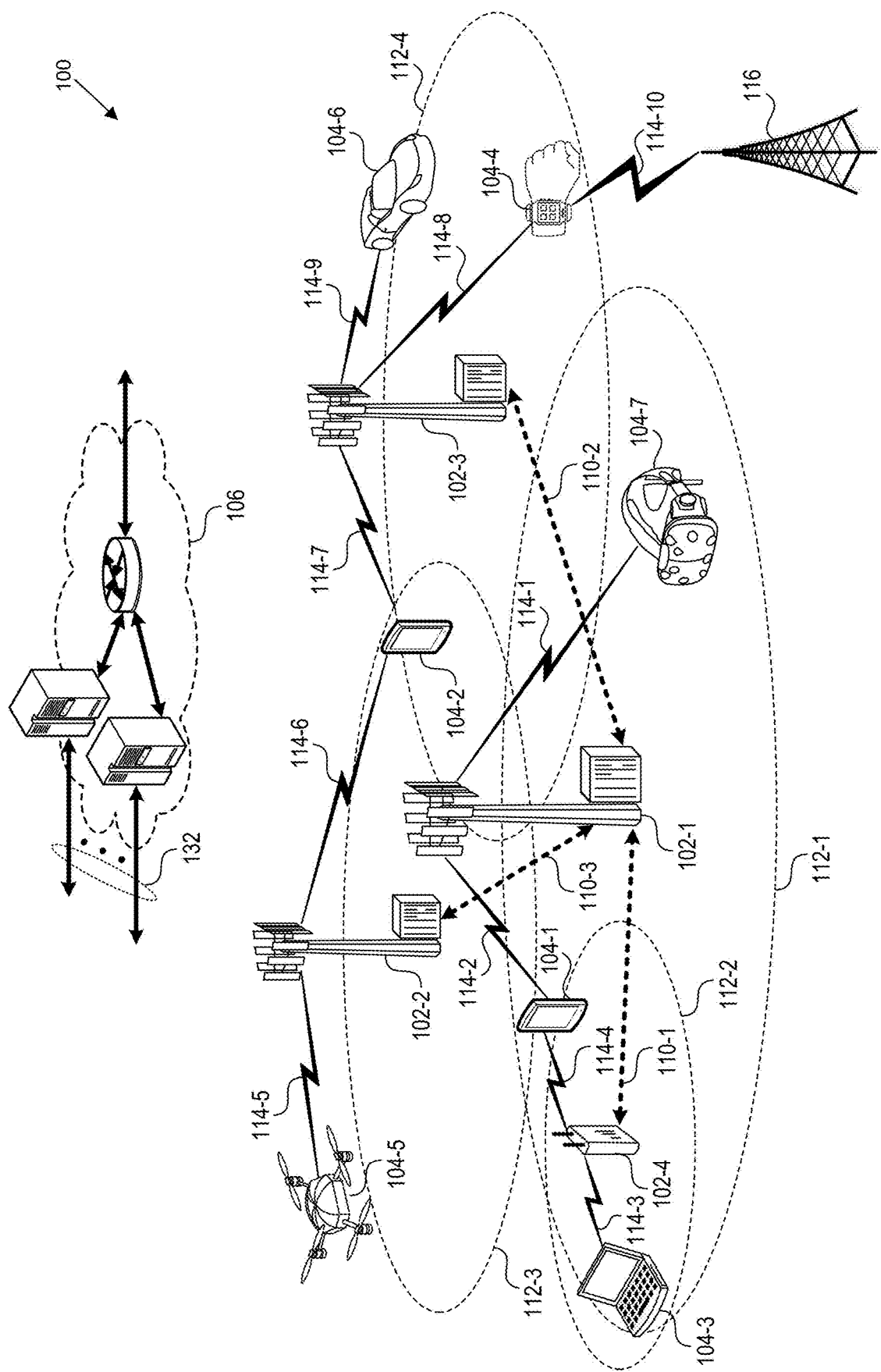
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings disclose a coverage analysis tool. In one aspect of the disclosed technology the coverage analysis tool determines if a cell is an over-shooter cell by comparing an actual coverage determined based on a distance between the cell and mobile devices associated with extracted geolocated call data, and an expected or designed coverage determined based on an average distance between the cell and one or more closest neighbor cells in a direction of coverage of the cell.

To determine the one or more closest neighbor cells in the direction of coverage of the cell that are used for the under-shooter determination, the coverage analysis tool determines an azimuth and beamwidth of a sector antenna of the cell and determines a search area based on an offset degree above and below the azimuth. If no neighbor cell is found in the search area, the coverage analysis tool expands the search area by an offset degree repeatedly until the search area is equal to the cell antenna beamwidth. If, after the maximum expansion to the sector antenna beamwidth, eligible neighbor cells are not identified, the coverage analysis tool uses a default inter-site distance to determine the expected or designed coverage which is compared with the actual coverage.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Computer System

Figure 2:
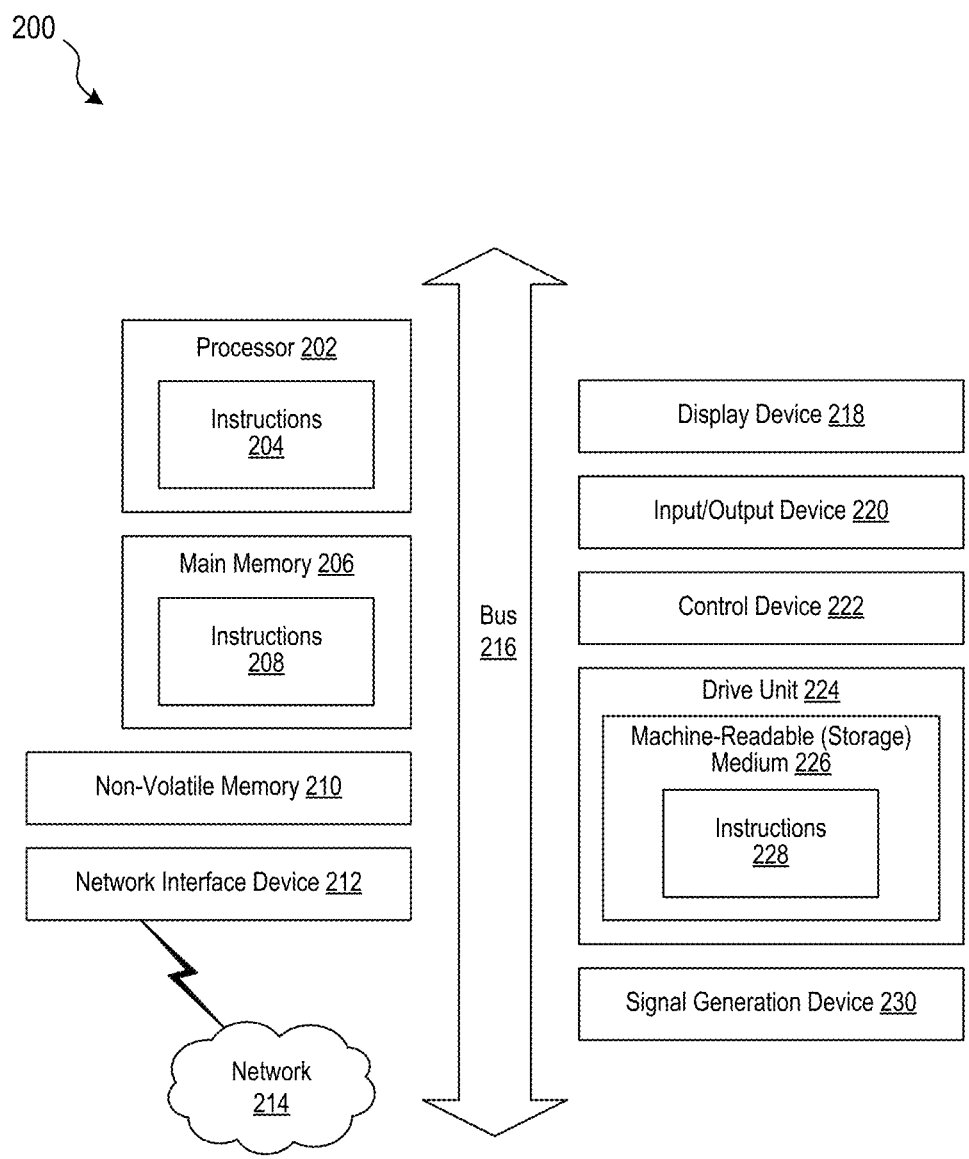
FIG. 2 is a block diagram that illustrates an example of a computer system in which at least some operations described herein can be implemented.

FIG. 2 is a block diagram that illustrates an example of a computer system 200 in which at least some operations described herein can be implemented. As shown, the computer system 200 can include: one or more processors 202, main memory 206, non-volatile memory 210, a network interface device 212, video display device 218, an input/output device 220, a control device 222 (e.g., keyboard and pointing device), a drive unit 224 that includes a storage medium 226, and a signal generation device 230 that are communicatively connected to a bus 216. The bus 216 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computing system 200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 200. In some implementation, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 200 can perform operations in real-time, near real-time, or in batch mode.

The network interface device 212 enables the computing system 200 to mediate data in a network 214 with an entity that is external to the computing system 200 through any communication protocol supported by the computing system 200 and the external entity. Examples of the network interface device 212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 206, non-volatile memory 210, machine-readable medium 226) can be local, remote, or distributed. Although shown as a single medium, the machine-readable medium 226 can include multiple media (e.g., a centralized/distributed database and/or associated caches and servers) that store one or more sets of instructions 228. The machine-readable (storage) medium 226 can include any medium that can store, encoding, or carrying a set of instructions for execution by the computing system 200. The machine-readable medium 226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 204, 208, 228) set at various times in various memory and storage devices in computing device(s). When read and executed by the processor 202, the instruction(s) cause the computing system 200 to perform operations to execute elements involving the various aspects of the disclosure.

Overview of Automated Coverage Bin Analysis

Figure 3:
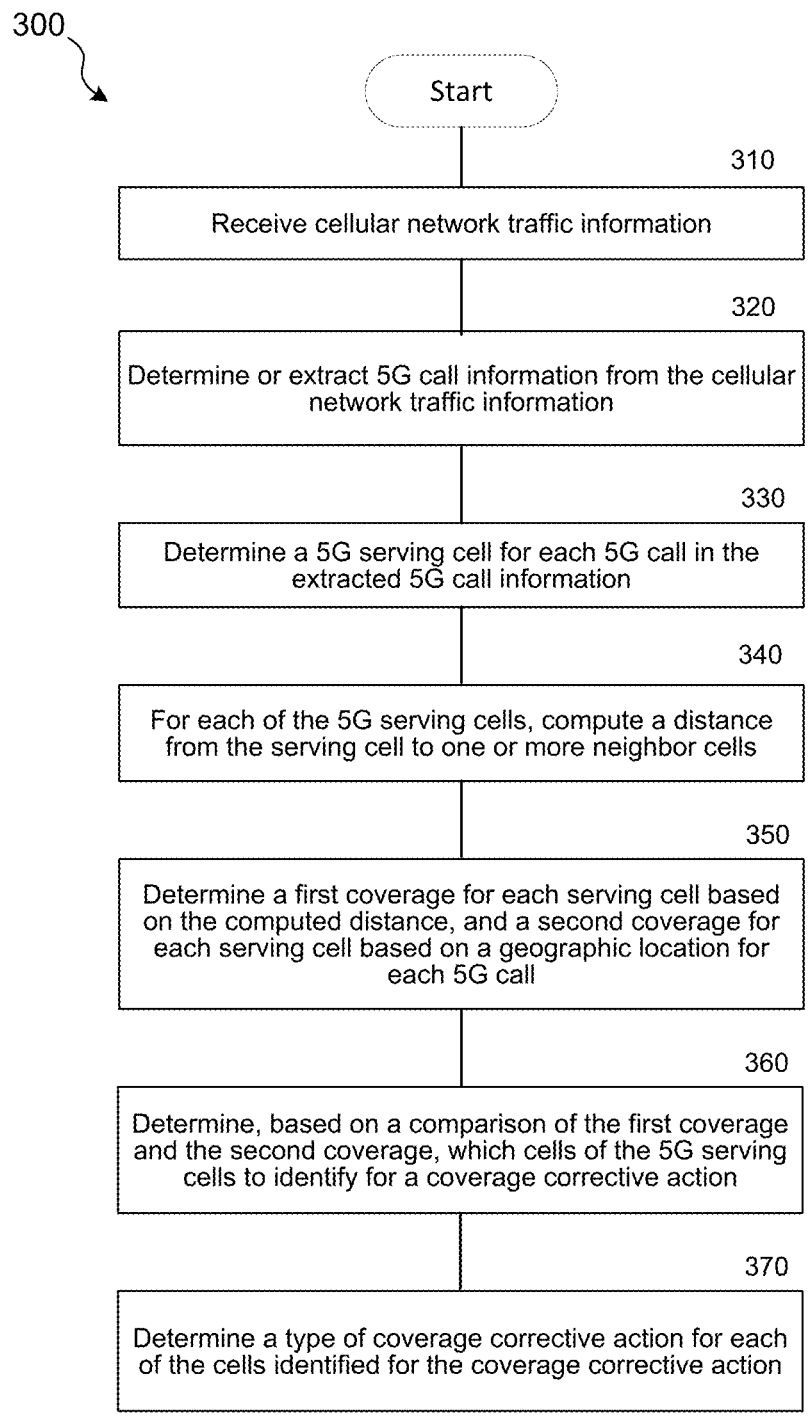
FIG. 3 is a flowchart that illustrates an automated process for identifying cells requiring coverage adjustment.

FIG. 3 is a flowchart 300 that illustrates an automated process for identifying cells requiring coverage and/or capacity adjustment. At block 310, the coverage analysis tool (which includes an automated coverage bin data analysis algorithm described here) receives cellular network traffic information (e.g., from a pre-existing database). In some implementations, the cellular network traffic information includes geo-located call information or data traffic information corresponding to one or more radio access technologies (RATs). For example, the cellular network traffic information can include Evolved Universal Mobile Telecommunications System Terrestrial Radio Access Network (EUTRAN) New Radio (NR) dual connectivity (EN-DC) cellular network traffic information based on a non-standalone (NSA) New Radio (NR) RAT.

The non-standalone mode of 5G NR, uses a 4G Long Term Evolution (LTE) control plane and 5G NR user plane which allows cellular network operators to speed up the deployment of 5G NR on top of the operators' existing 4G LTE infrastructure. Because of the ongoing development of the 5G NR network, 5G NR data sources can be limited, and call data might not be readily available from existing datasets (e.g., Truecall LSR data). Furthermore, unlike in LTE networks containing neighbor information, calculation of distance to 5G NR serving cell neighbors can be complicated by absence of neighbor information in NSA 5G NR datasets. Moreover, neighbor 5G NR sites are constantly being upgraded as technology evolves and new sites being added increasing the probability of coverage holes being introduced and necessitating the need to recursively optimize coverage via the disclosed automated coverage bin analysis tool. The automated coverage analysis tool includes an algorithm that analyzes geo-located user call data to assess cell coverage and provide recommendations to correct coverage issues. Use of the disclosed technology precludes the use of time/resource intensive and error prone conventional manual coverage analysis techniques. As described below, the coverage analysis tool scrapes 5G information from calls to identify coverage tuning opportunities for 5G cells (e.g., automated coverage optimization). This drive-less coverage tuning of the 5G network saves hours, days or weeks of drive test data collection and provides a quicker network optimization when compared to conventional methods. Although the disclosed systems and methods use 5G NR NSA RATs with EN-DC mode as representative data source, the systems and methods are applicable to different RATs and operation modes including standalone (SA) NR with or without carrier aggregation (CA) or dual connectivity (DC). It will also be appreciated that, although described in relation to improving coverage, the same techniques described here can be used to improve capacity in different spatial regions of the wireless communication network.

At block 320, the coverage analysis tool determines (e.g., extracts) call information (e.g., information related to one or more calls or data traffic) corresponding to a particular RAT from the cellular network traffic information (e.g., extracts 5G call information from the cellular network traffic information).

For example, as shown in Table 500 in FIG. 5 which illustrates representative cellular traffic information for automated coverage analysis, the cellular network traffic information can include information stored in a database on a periodic basis related to 4G LTE network traffic only (e.g., row 510 in FIG. 5), and information related to both 4G LTE and 5G NR network traffic (e.g., row 520 in FIG. 5). For example, Row 520 in FIG. 5 might correspond to Non-standalone (NSA) 5G information with a 4G LTE anchor. The coverage analysis tool extracts all the calls with 5G information such as rows 520 and 580 from a database, table, or other storage containing all the call information. The coverage analysis tool further filters and organizes the extracted call data to get 5G cell and radio frequency (RF) information relevant for automated coverage analysis including, for example, the 5G NR signal strength (e.g., reference signal received power (RSRP) value 528), the signal quality (e.g., reference signal received quality (RSRQ) value 529), and the physical cell identifier (PCI) (e.g., the PCI value 525).

The different columns in Table 500 in FIG. 5 can be used for different purposes in the coverage analysis tool. For example, the 5G_nr_Serving_Cell column 575 can be used to map to easier network cell_name (e.g., a 14 digit unique number can be reversed mapped to an alphabetical name for easier identification such as "LBQ06091C11") allowing column 575 to be used to get column 570.

The 5G_nr_serving_pci column 576 can be used to filter the network cell list, so that the distance from the extracted call to the cells is computed efficiently. Instead of finding the distance of a call from all the cells in network, physical cell identifier (PCI) information in column 576 can be used to filter potential target cells so that only cells with PCI identified in call is used in the distance computation. This can save time in the coverage analysis tool's calculations, e.g., when millions of calls are analyzed. Mapping serving cells to geo-located call information using PCI information is described in more detail below with respect to FIG. 4.

The extracted call information is a collection of calls from all layers of 5G network. Each layer has a unique absolute radio frequency channel number (ARFCN) value as indicated in the 5G_nr_serving_ARFCN column 577. To accurately determine cells where the calls were made and distances, ARFCN information can be used to filter the target cells. For example, distance between call and cell can be calculated only on cells transmitting on the specific ARFCN. Also, for cell-to-cell distance calculation (e.g., for "first tier" distance calculation), only cells of the same ARFCN are used. Calculating the first tier distance is described in more detail below in relation to block 340 of FIG. 3 and FIG. 6.

The 5G_nr_rsrp column 578 and 5G_nr_rsrq column 579 can be used to determine how weak or strong the coverage was when the call was made. The RSRP and RSRQ values in these columns help identify over-shooter and under-shooter cells. For example, the coverage check can help identify over-shooter/under-shooter cells from among potential over-shooter and potential under-shooter cells. Additional details on determining under-shooter and over-shooter cells based on signal strength or signal quality can be found below with respect to FIG. 10.

Turning back to FIG. 3, at block 330, the coverage analysis tool determines from the extracted call information (e.g., the extracted 5G NR information), a serving cell for each extracted call. For example, the coverage analysis tool determines a 5G serving cell that is likely serving each 5G call in the extracted 5G call information. Additional details on a representative method that the coverage analysis tool can use to determine the 5G serving cells for each of the 5G calls is described below in relation to FIG. 4.

At block 340, the coverage analysis tool computes a distance from each serving cell to one or more neighbor cells (e.g., a "first tier" distance from each 5G serving cell to its closest neighbor cell within coverage). The first tier distance can be used as a visual aid by network engineers to limit coverage from the cell to be optimized. Additional details on a representative method that the coverage analysis tool can use to compute the distance from the serving cell to the one or more neighbor cells is described below in relation to FIG. 6. As will be described in FIG. 6, calculating the first tier distance accurately ensures accurate results from the automated coverage analysis tool.

At block 350, the coverage analysis tool determines a first coverage and second coverage for each of the serving cells. The first coverage is based on the distance computed in block 340 between the serving cell and the one or more neighbor cells (e.g., based on the first tier distance). The second coverage is based on the distance between the serving cell and a geographic location for each of the extracted geo-located 5G calls (e.g., distance from the serving cell to the geographic location where the mobile communication device was located when the call was made or received).

In some implementations, the coverage analysis tool uses the first tier distance calculated for each sector to assess calculated coverage vs expected coverage for the cell. The expected coverage is the original designed coverage of the cell. When a cell is initially designed, coverage can be defined based on signal strength (RSRP) above a certain design threshold (e.g., −90 dBm) at the first tier distance. Such coverage threshold can vary in different environments (e.g., urban areas vs rural areas) and also depending on how dense the buildings are (e.g., Manhattan can have a design threshold of −65 dBm but Nassau county in Long Island can have a design threshold of −85 dBm because there is higher penetration loss due to buildings). The antenna tilt, radio signal power, and other network parameters can be set based on height of the cell and intended coverage area (among other factors). Conversely, the calculated coverage is an estimate of cell coverage based on the coverage data (RSRP/RSRQ) from the extracted call. The calculated coverage is the actual coverage as seen by network subscribers. If the calculated coverage differs significantly from design coverage, further coverage tuning is required such as adjusting the radio signal power or antenna tilt.

The distance between the serving cell and the geo-located call data can be determined based on the latitude and longitude coordinates corresponding to the call data (e.g., latitude 522 and a longitude 523 in FIG. 5) and a geographic location of the 5G serving cell (e.g., 5G serving cell 524 in FIG. 5) (latitude and longitude of 5G serving cell 524 not shown in FIG. 5).

Coverage of a cell depends on radio frequency (RF) signal propagation parameters including the antenna type in the cell (e.g., the gain, beamwidth, polarization, etc., of a sector antenna of the serving cell) and the radio propagation properties of the radio channel which is based on, for example, the frequency, path loss, multipath interference, etc. A cell provides coverage to mobile devices or user equipment (UEs) in the cellular network when the cell is the "strongest" among other cells in the area. If the cell is not the strongest in the area but is still transmitting signals to a particular UE in a particular geographic spot, that cell can act as an interferer and thereby degrade the RSRQ at the UE.

At block 360, the coverage analysis tool determines whether to identify the serving cell for a coverage corrective action based on a comparison between the first coverage and the second coverage. In some implementations, the determination or recommendation on whether to identify the serving cell as needing a coverage corrective action is also based on whether a signal strength (e.g., RSRP) and/or a signal quality (e.g., RSRQ) of the calls served by the serving cell is above or below a signal strength or signal quality threshold. The flagged cells (serving cells identified for corrective action) can be reported in various ways including on a spreadsheet report of flagged cells or via different visual rendering of problem cells in a network coverage map.

In some implementations, the report of cells flagged for corrective action (or the visual rendering of such cells in a network coverage map) can include a ranking of cells from worst-offenders to least offenders. For example, this ranking can be based on the deviation between the expected coverage and the calculated coverage, or as will be described in relation to FIG. 10, based on the deviation between the distance from the serving cell to one or more neighbor cells (first tier distance) and the distance from the serving cell to each call served by the serving cell. The most critical cells (e.g., cells that network engineers should attend to first) can be first in the list or include a priority indicator or a different visual rendering (e.g., dark red).

At block 370, in some implementations, the coverage analysis tool also determines the type of coverage corrective action to recommend. For example, after the coverage analysis tool identifies coverage "offenders" at block 360 by filtering "outliers," the coverage analysis tool can recommend to the network engineering or user of the coverage analysis tool to adjust the tilt (elevation) of the serving cell antenna or adjust the transmit power to adjust coverage for the offender cells. For example, down tilting an elevation of a sector antenna of the serving cell or reducing the transmit power can reduce the number of overshooting calls and uptilting an elevation of the sector antenna can reduce the number of undershooting calls. Over-shooter cells serve areas that the cells were not designed to serve which can lead to dropped calls and/or interference. Consequently, reducing the number of cells causing overshoot in RF coverage can improve the network's performance and quality of the user experience. Reducing under-shooters improves RF coverage allowing the operator to serve more users.

The coverage analysis tool can also recommend and approximate value for the antenna tilt (down tilt or up tilt) or an approximate value of power adjustment (power reduction or increase) recommended based on, for example, the height of the serving cell antenna, height and distance of adjacent buildings or other tall structures in the vicinity of the serving cell, the intended distance to extend coverage to or from, the frequency band, antenna properties (gain, beamwidth, front-to-back ratio, etc.), transmit power, etc. The network engineer can apply the recommended tilt or power adjustment, rerun the coverage analysis tool, and adjust again by a certain amount (e.g., by a certain degree of tilt or certain dBm or Watts of power adjustment) again until they obtain the desired coverage results.

In some implementations, the network can automatically adjust a property of the over-shooter/under-shooter serving cell to adjust a coverage or a capacity of the serving cell based on the results of the coverage analysis. For example, the coverage analysis tool can cause a node in the cellular/wireless communication network to automatically adjust the antenna tilt of a sector antenna via electrical up- or down-tilt or increase or decrease the transmit power of the serving cell based on the type and extent of coverage issue (e.g., whether the cell is overshooting or undershooting and the extent of overshooting/undershooting).

In some implementations, the coverage analysis tool can be coupled to an electrical tilt capability of the antenna and can repeatedly adjust the property of the serving cell (e.g., repeatedly up tilt/down tilt or increase/decrease power) and rerun analysis until the coverage issue is resolved (e.g., until the designed coverage matches the actual coverage). For example, as part of a self-optimizing or self-organization network (SON) capability, the coverage analysis tool can repeatedly apply, or cause to be applied, electrical down tilt or up tilt in certain increments (or automatically cause to increase or decrease transmit power) to a cell sector antenna when the number of over-shooter or under-shooter calls served by the cell is above a predetermined threshold, and continue to apply tilt or power adjustments over time until the number of over-shooter/under-shooter calls falls below the predetermined threshold. For example, the coverage analysis tool and/or the SON network can continue to apply the corrective action, or can select the degree of up- or down-tilt or amount of power increase/decrease, until the coverage analysis tool determines (e.g., from subsequent analysis as described above) that the intended, designed, or expected coverage of the serving cell matches the actual or computed coverage. Automatic adjustment of tilt or transmit power can be done with or without manual intervention by a user. For example, in some implementations, the results of the coverage analysis can initiate the automatic tilt or power adjustment in the network. In other implementations, a user can instruct only certain sector antennas or cells to automatically adjust tilt or power level based on the results of the coverage analysis and/or set limits to the automated adjustments.

In some implementations, the coverage analysis tool and/or the SON network can determine the order of cells to apply the corrective action based on the severity of the cell's coverage problem as described below (e.g., based on a priority indicator indicating the severity of the problem as described below, the coverage analysis tool and/or the SON network can determine to apply a corrective action to a more problematic serving cell before applying a corrective action to a less problematic serving cell).

Mapping Serving Cells to Geo-Located Call Data

Figure 4:
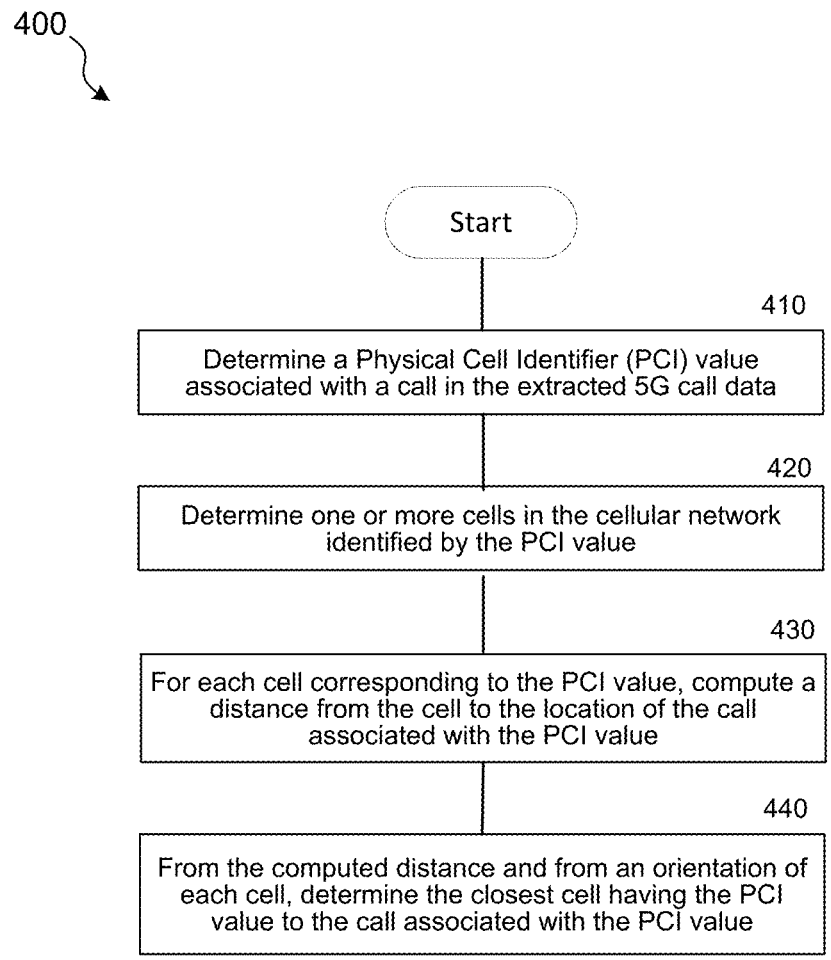
FIG. 4 is a flowchart that illustrates mapping serving cells to geo-located call information.

FIG. 4 is a flowchart 400 that illustrates mapping serving cells to geo-located call information (e.g., reverse mapping of 5G cells to the 5G call information extracted at block 320 in FIG. 3). At block 410, the coverage analysis tool determines a primary cell identity or physical cell identifier (PCI) value associated with a call in the extracted 5G call information. For example, as shown in the cellular traffic information table 500 in FIG. 5, the coverage analysis tool can extract row 520 call data information and determine that the serving cell for that call is identified with PCI value label 525 (PCI value=130).

At block 420, the coverage analysis tool determines one or more cells in the cellular network corresponding to or identified by the PCI determined at block 410. For example, 5G NR specifies up to 1008 unique PCI values and a value can be reused in the network so the coverage analysis tool determines a location of all the cells that reuse the PCI value.

At block 430, the coverage analysis tool computes a distance from each of the cells identified at block 420 to the location of the 5G call in the extracted 5G call data. In some implementations, the coverage analysis tool includes information from a network information database or table which contains the geographic location (e.g., latitude/longitude) of each cell in the network, the azimuth of the cell (or azimuth of different sector antennas in the cell), and the PCI value identifying the cell. Additionally, the extracted 5G geolocated call data includes a spatial/geographic location associated with the call, e.g., latitude 522 and longitude 523 in extracted call data row 520 in FIG. 5. Using the location of the cells with the given PCI and the locations of the calls with the same PCI, the coverage analysis tool can compute the distance from each of those cells to each call. As will be described in additional detail below, once the distance is calculated for every call in the geolocated call information table (each having specific PCI), to all cells in the network with the same PCI, the serving cell is chosen based on, for example, shortest distance and orientation.

At block 440, the coverage analysis tool determines based on the distance computed at block 430, and based on an orientation of all the cells, the closest cell having the given PCI value to the call associated with the same PCI value. For example, the coverage analysis tool can determine which cells with a PCI value of 130 have sector antennas with an azimuth or angle of transmission in the direction of the call(s) served by a cell with a PCI value of 130. The coverage analysis tool can then determine which cell, of all the cells pointing in the direction of the corresponding call, has the shortest distance to the call. This closest cell is the most likely cell serving the call and is thus identified as the serving cell for the call, for example, as described in relation to block 330 in FIG. 3. In some implementations, the closest cell information is appended to a table containing the geolocated call information and the table is then sorted by cell for subsequent analysis by the coverage analysis tool.

Determining Distance from Serving Cell to Eligible Neighbor Cells

Figure 6:
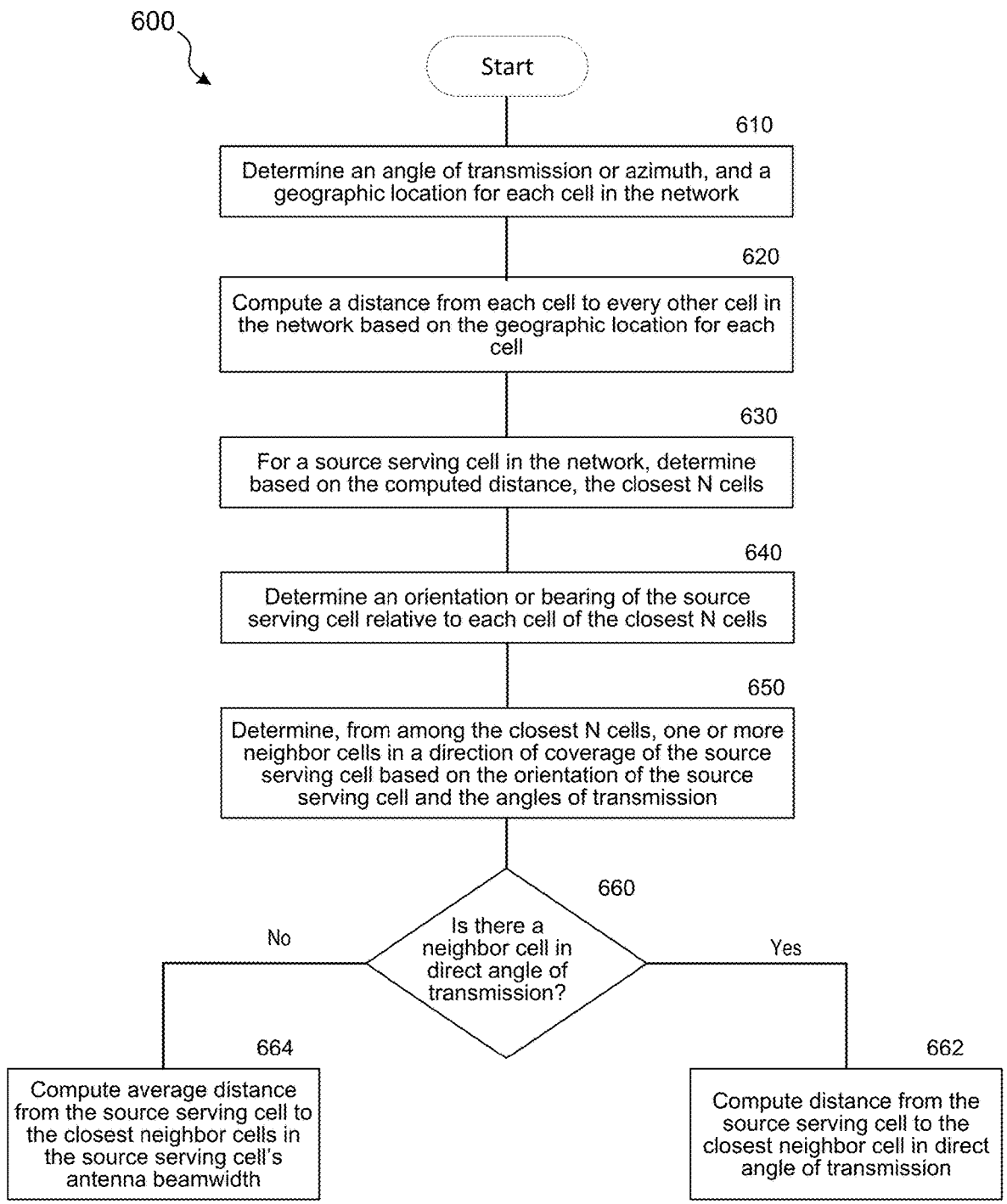
FIG. 6 is a flowchart that illustrates determining a distance between a serving cell and one or more neighbor cells relevant for automated coverage analysis.

FIG. 6 is a flowchart 600 that illustrates determining a distance between a serving cell and one or more neighbor cells that are relevant for automated coverage analysis. At block 610, the coverage analysis tool determines an angle of transmission or azimuth and a geographic location (e.g., lat/lon coordinates) or each cell (or each sector antenna in each cell) in the cellular network.

At block 620, the coverage analysis tool computes or determines a distance from each cell to every other cell in the cellular network (or from each sector antenna to every other sector antenna in the network) based on the geographic locations of each cell/sector determined at block 610.

At block 630, the coverage analysis tool determines or isolates a first number of cells closest to a source serving cell (e.g., the closest N cells to the serving cell, where the serving cell is determined at block 330 in FIG. 3 or determined by Flow 400 in FIG. 4). In some implementations, the coverage analysis tool can use the distances computed at block 620 to determine the closest cells. In other implementations, the closest cells to each cell are predetermined and stored in a database or other storage for lookup by the coverage analysis tool.

At block 640, the coverage analysis tool determines an orientation or bearing of the serving cell relative to each of the cells in the closest N cells determined at block 630.

At block 650, using the orientation or the bearing of the serving cell determined at block 640, and the angles of transmission or azimuth of each of the cells or each sector of each cell in the closest N cells determined at block 610, the coverage analysis tool determines which of the N closest cells are eligible neighbor cells. For example, the coverage analysis tool determines one or more neighbor cells in direction of coverage of the source serving cell and uses these neighbor cells for subsequent coverage analysis as described further below. The value of the number of the closest cells selected (N) can be chosen by the user of the coverage analysis tool or by the network based on the network topology, e.g., cell density of the wireless network (number of cells per square area). For example, N can be large (e.g., N=6) for urban areas or areas with dense cells (e.g., 5G NR small cells), and small (e.g., N=3) for rural areas where there might not be 6 neighbor cells to consider for optimization.

In some implementations, the coverage analysis tool can determine whether the one or more neighbor cells are in a direction of coverage of the serving cells by determining whether the coverage of the serving cell (based on the azimuth and beamwidth or angle of transmission of a serving cell sector antenna) overlaps (fully or partially) the coverage of the neighbor cell (based on an azimuth and beamwidth or angle of transmission of a neighbor cell sector antenna). Antenna azimuth and beamwidth along with distance between serving cell and neighbor cell are used to determine whether they serve in same direction.

Figure 8:
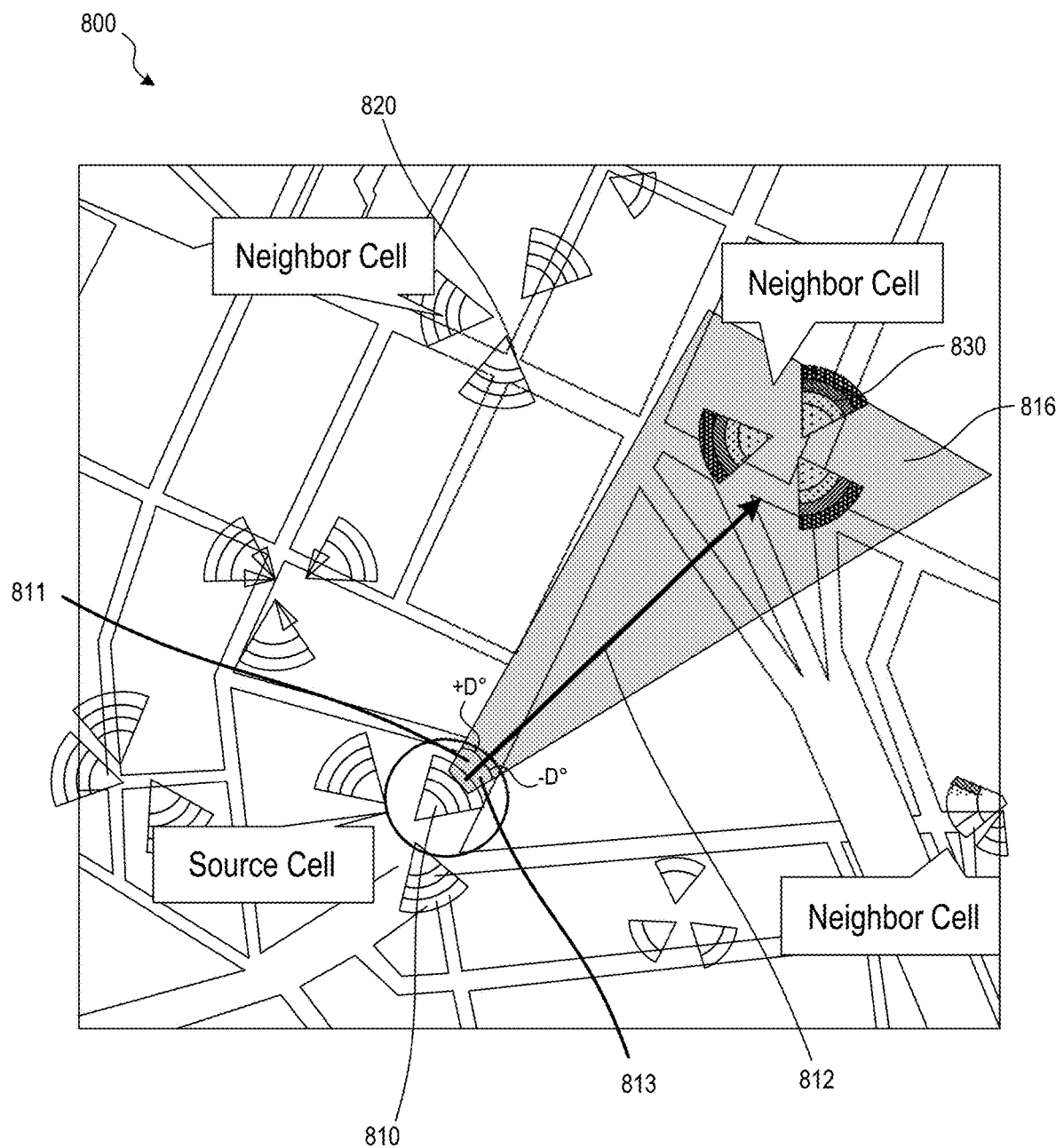
FIG. 8 is a map that illustrates a cellular network with a serving cell aligned at a direct angle of transmission to a single neighbor cell.
Figure 9:
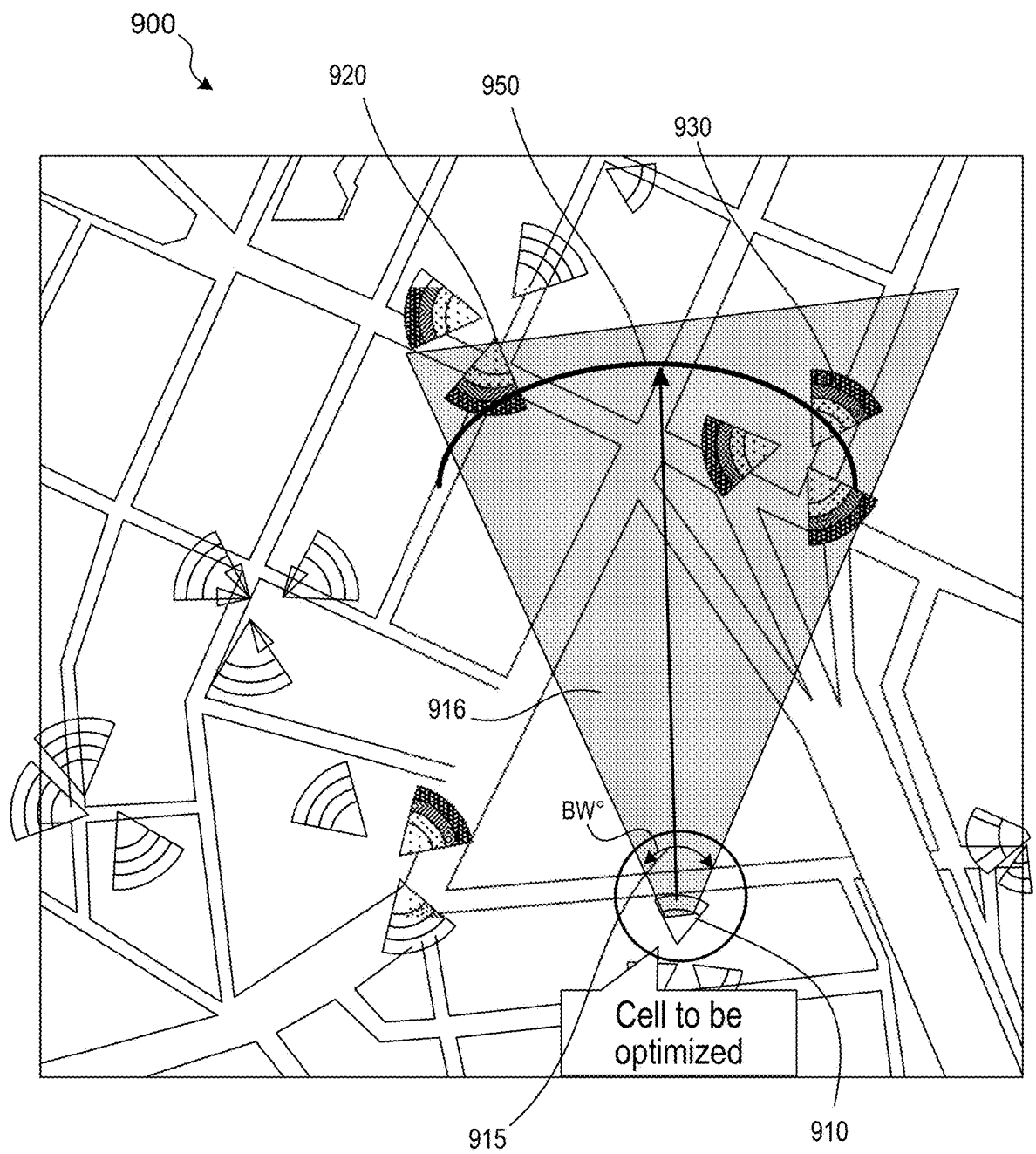
FIG. 9 is a map that illustrates a cellular network with a serving cell not aligned in a direct angle of transmission to a single neighbor cell.

At block 660, the coverage analysis tool determines if any of the neighbor cells determined at block 650 is in a direct angle of transmission. For example, turning to map 800 in FIG. 8 which illustrates a cellular network with a source serving cell aligned at a direct angle of transmission to a single neighbor cell, the coverage analysis tool can determine at block 660 that serving cell 810 (or a sector antenna in serving cell 810) is in a direct angle of transmission to cell 830 (or a sector antenna in cell 830). Conversely, turning to map 900 in FIG. 9 which illustrates a cellular network with a source serving cell not aligned in a direct angle of transmission to a single neighbor cell, the coverage analysis tool can determine at block 660 that serving cell 910 is not in a direct angle of transmission to cells 920 and 930.

At block 662, if there is a cell in the neighbor cells list at a direct angle of transmission, the coverage analysis tool computes the distance from the serving cell to the closest neighbor cell in a direct angle of transmission (e.g., the "first tier" distance). For example, the coverage analysis tool can use the distances computed at block 620.

Conversely, at block 664 if there is no cell in the neighbor cells at a direct angle of transmission, the coverage analysis tool computes an average distance from the source serving cell to the closest neighbor cells in a direction of transmission within the serving cell's antenna beamwidth.

In some implementations, the average distance or first tier distance from the serving cell to the closest neighbor cells can be based on computing the sum of the distances from the serving cell to each neighbor cell divided by the number of neighbor cells (e.g., a simple average of the distances). In other implementations, an arc or line can be defined (e.g., arc 950 in FIG. 9) between the eligible neighbor cells and a distance between the serving cell and the arc/line midpoint can be computed to determine the first tier distance. If the first tier distance is too small, the coverage analysis tool could find too many over-shooters (too many false positives) which could happen if the coverage analysis tool determines the first tier distance without averaging (e.g., by taking the absolute distance to the closest site to any sector without taking directionality into consideration).

In some implementations, the coverage analysis tool can determine the first tier distance using handover statistics. For example, based on handover statistics from key process indicators (KPI) between source sector of the serving cell and sectors of the neighbor cells, the coverage analysis tool can sort the neighbors from highest to lowest based on handover counts and then average the distance between the top N neighbors with highest handovers (or the neighbors with number of handover or handover attempts above a threshold number). In some implementations, the coverage analysis tool can determine the top N neighbors based on the top X percentile of handover counts or based on absolute counts. For example, all the neighbors with a minimum of 100 handovers or handover attempts between source and target or all the neighbors with more than X % of all handover attempts/counts.

Determining Eligible Neighbor Cells

Figure 7:
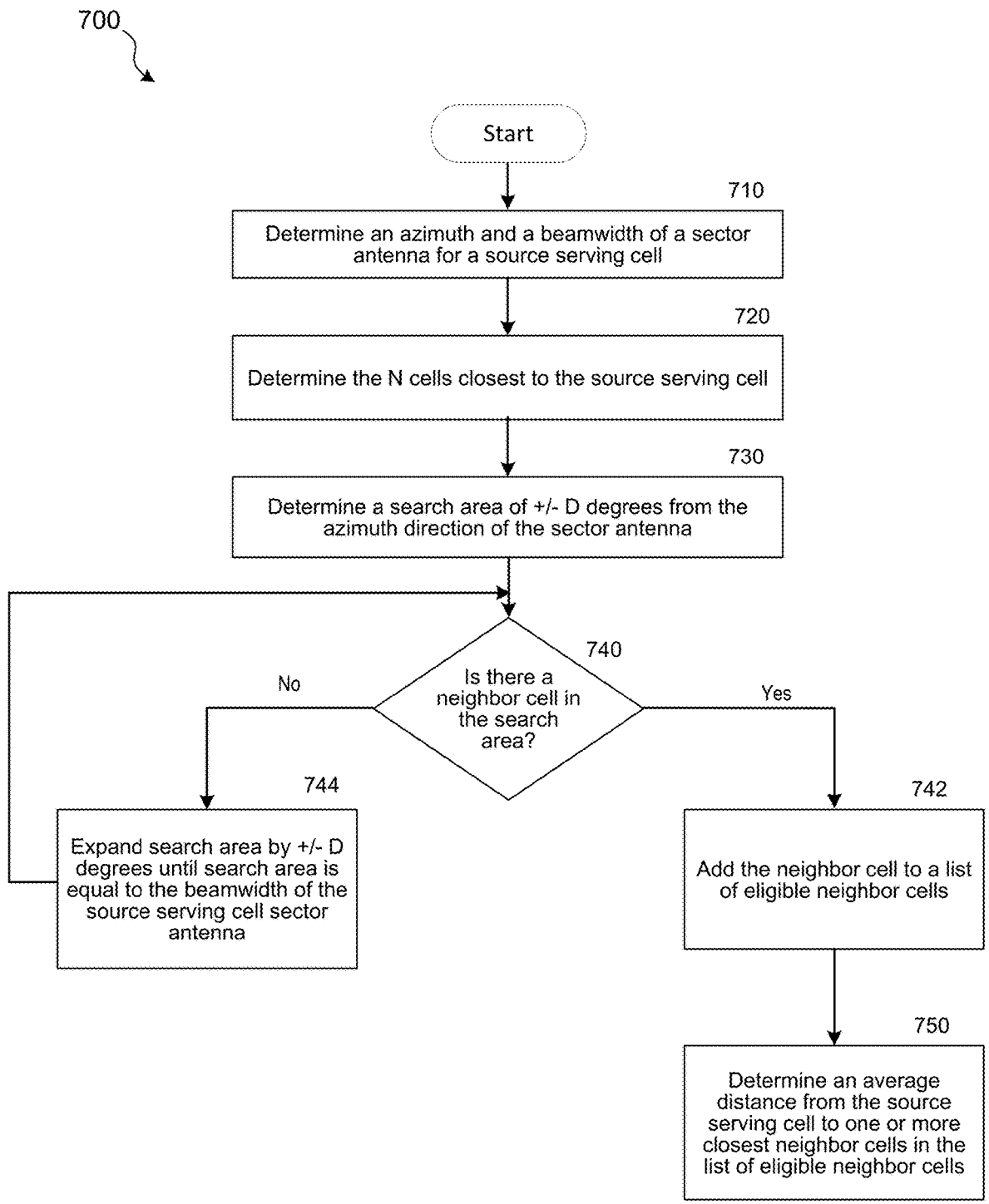
FIG. 7 is a flowchart that illustrates determining relevant neighbor cells in a search area based on a serving cell antenna azimuth and beamwidth.

FIG. 7 is a flowchart 700 that illustrates determining relevant or eligible neighbor cells in a search area based on a source serving cell's antenna azimuth and beamwidth. At block 710, the coverage analysis tool determines an azimuth and a beamwidth of an antenna (e.g., a sector antenna) of the source serving cell.

At block 720, the coverage analysis tool determines the N cells closest to the source serving cell, for example, as described in relation to block 630 in FIG. 6.

At block 730, the coverage analysis tool determines a search area around the azimuth direction of the source serving cell's sector antenna. In some implementations, the coverage analysis tool determines +/−D offset degrees above and below the azimuth direction (e.g., +/−10° from North, if the azimuth direction or bearing is due North).

At block 740, the coverage analysis tool determines if there is a neighbor cell in the search area determined at block 730. For example, turning to map 800 in FIG. 8, the coverage analysis tool can determine at block 730 a search area 816 by taking +D° (angle 811) and −D° (angle 813) from azimuth direction 812. At block 740, the coverage analysis tool can determine that there is a neighbor cell 830 within the search area 816.

If there is one or more neighbor cells within the search area, the coverage analysis tool at block 742 adds the neighbor cell(s) found to a list of eligible neighbor cells (e.g., neighbor cells that could be used as a basis for finding the first tier distance like described in relation to flow 600 in FIG. 6). For example, the list of eligible neighbor cells are the one or more neighbor cells in a direction of coverage of the serving cell determined at block 650 in FIG. 6.

If at block 740 there is no neighbor cell with the search area, the coverage analysis tool at block 744 expands the search area by an additional +/−D offset degrees (e.g., a new search area of +/−20° from North, where the azimuth direction or bearing is due North). The coverage analysis tool then determines at block 740 if there is an eligible neighbor cell in the expanded search area and, if not, further expands the search area by the +/−offset degrees until the search area covers an area defined by an angle equal to the beamwidth of the serving cell sector antenna (e.g., until search area is defined by an angle equal to 120° for a 120° beamwidth serving cell sector antenna). For example, turning to map 900 in FIG. 9, the coverage analysis tool can find eligible cells 920 and 930 within expanded search area 916 where the search area 916 has been expanded to encompass an angle equal to the serving cell antenna's beamwidth 915.

If at block 744 the search area is equal to the beamwidth and no cells have been identified in the search area for the first tier distance calculation (e.g., list of eligible neighbor cells at block 742 is empty), a default inter-site distance can be used as a constant reference value (e.g., 1 km). This reference value can be used as the first tier for any cell where neighbor cells do not exist such as sectors or cells next to beaches where the sectors pointing towards the ocean may not have neighbors.

At block 750, the coverage analysis tool determines an average distance from the source serving cell to one or more closest neighbor cells of the eligible neighbor cells added to the list of eligible neighbor cells at block 742. For example, the coverage analysis tool determines this average distance as described in relation to blocks 650, 660, 662, and 664 in FIG. 6.

Identifying Problem Cells

Figure 10:
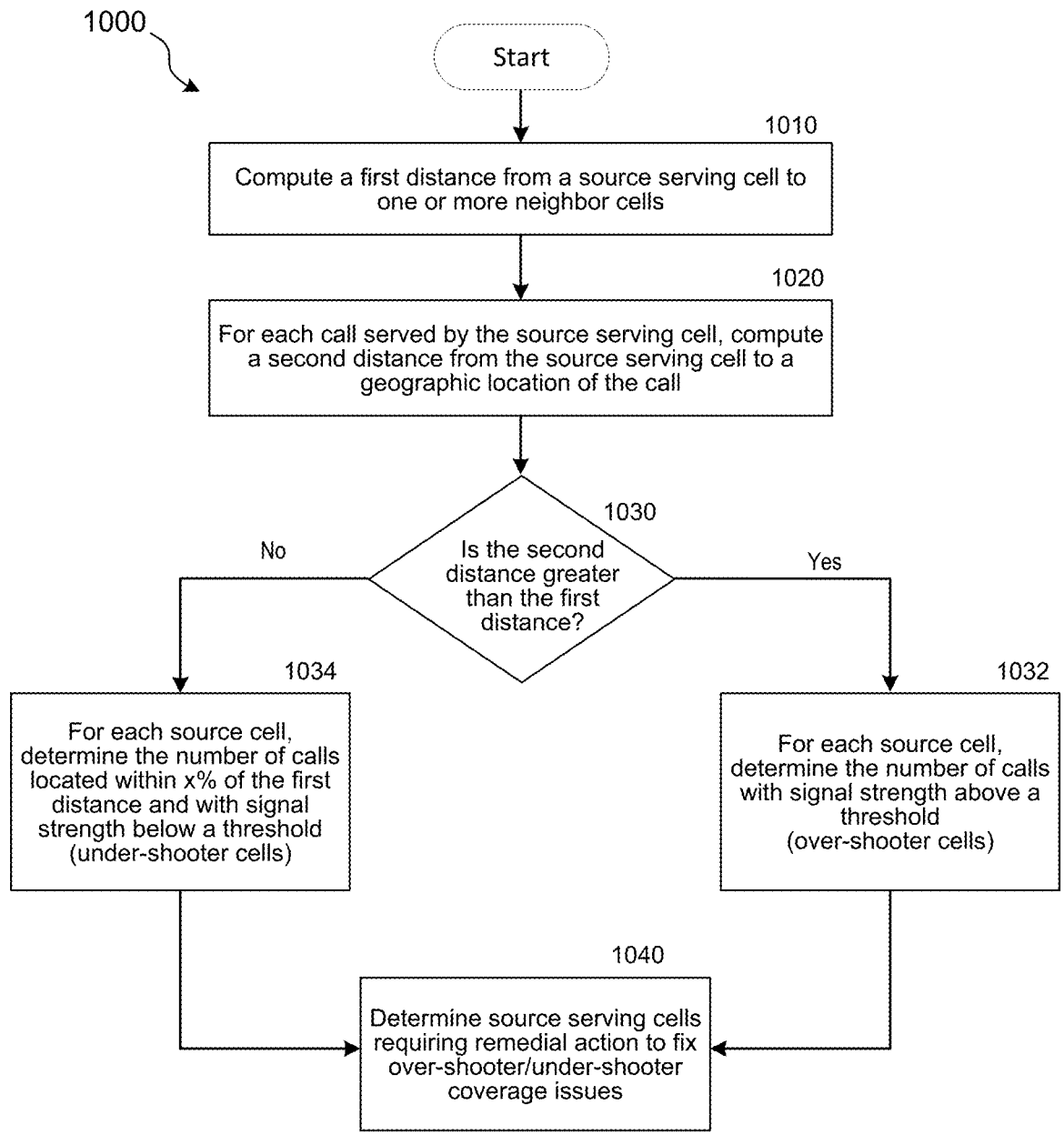
FIG. 10 is a flowchart that illustrates identifying serving cells with over-shooter or under-shooter calls.

FIG. 10 is a flowchart 1000 that illustrates identifying serving cells with over-shooter or under-shooter calls. At block 1010, the coverage analysis tool computes or determines a first distance from the source serving cell to one or more neighbor cells, e.g., a first tier distance as determined in block 340 of FIG. 3.

In some implementations, the coverage analysis tool can determine a second tier distance (e.g., as described in relation to FIG. 6 but based on the next closest neighbor cells in direction of coverage). The coverage analysis tool can use the second tier distance to identify severely overshooting cells.

At block 1020, the coverage analysis tool determines or computes a second distance from the serving cell to the geographic location of each call served by the serving cell (e.g., geographic location from the serving cell to the location of the wireless communication device associated with the call). For example, once the coverage analysis tool determines the serving cell serving each call based on the PCIs of the cells in the network and PCIs of the calls as described in relation to flow 400 in FIG. 4, the coverage analysis tool can determine the distance between the serving cells and the corresponding calls served by the serving cell at block 1020.

At block 1030, the coverage analysis tool compares the first distance and second distance to determine if there are any calls beyond the first tier distance (e.g., where the second distance is greater than the first distance).

At block 1032, the coverage analysis tool determines the number of calls above the first tier distance and with a signal strength above a first signal strength threshold (e.g., −90 dBm). The calls beyond the first distance (e.g., the first tier distance) and with strong signals (signal strength above a threshold) are over-shooter calls.

At block 1034, the coverage analysis tool determines the number of calls located within a certain percentage (e.g., x %) of the first distance (e.g., all calls served by a certain cell and contained within 50% of the first tier distance) and with signal strength below a second signal strength threshold (the first signal strength threshold for determining over-shooter cells and the second signal strength threshold for determining under-shooter cells can be the same or different). These calls indicate that the cell serving the calls is an under-shooter cell.

At block 1040, the coverage analysis tool determines serving cells requiring remedial action to fix over-shooter/under-shooter coverage issues by considering the number of over-shooter calls per cell at block 1032 or the number of under-shooter calls per cell at block 1034. For example, the coverage analysis tool can determine whether the number of calls with signal strength above the first threshold when the second distance is greater than the first distance (beyond first tier distance) is above a first threshold number of calls. Similarly, the coverage analysis tool can determine whether the number of calls with signal strength below the second threshold when the second distance is less than the first distance (within a certain percentage of first tier distance) is above a second threshold number of calls. This way, the coverage analysis tool can ignore few outlier calls and recommend corrective action when the number of problem calls is sufficiently large to point to a problem with the serving cell configuration or settings.

In some implementations, the number of bins/cells or calls/cell overshooting or undershooting is based on the dataset or the number of cells in the network. For example, the first and second threshold number of calls can be selected to control the number of cells identified for corrective action (e.g., limit the number of cells per run identified for correction). For example, the thresholds can be selected so no more than X cells out of Y total cells in the network are identified for corrective action. In some implementations, all offending cells are identified and the X most offending cells are reported for correction.

In some implementations, first distance computed at block 1010 and the second distance computed at block 1020 can be used to determine the degree of antenna up-tilt or down-tilt or the amount of power increase or decrease. For example, for a first cell where the over-shooting calls are further away from the first tier distance than the over-shooting calls of a second cell are, the first cell could have a higher degree of antenna down-tilt (relative to an initial tilt) than the second cell; or the first cell could get a larger power decrease than the second cell. Similarly, if the number of under-shooting calls are clustered much closer to a first serving cell than under-shooting calls are clustered to a second serving cell, the first serving cell could require a larger antenna up-tilt or a larger power increase than the second serving cell.

For example, the coverage analysis tool can determine at block 1040 that a source serving cell is problematic when a certain percentage of calls of the total number of calls in the dataset are under-shooter or over-shooter calls (e.g., if use a 10% threshold, and there are 100 calls in the network, if 10 calls associated with a cell are over-shooter calls, that cell would be identified for coverage improvement such as down tilt or power reduction).

In some implementations, the coverage analysis tool can automatically determine this percentage threshold as part of a recursive optimization algorithm such as a machine learning algorithm. A lower percentage threshold will yield more false positives and a higher percentage threshold will limit the number of over-shooters identified. In a manually optimized network, the targeted list of over-shooters can depend on how aggressive the network engineers or other users of the coverage analysis tool want to be and the resources available for manually tuning coverage and capacity. In an automated system, the percentage threshold can be selected to be high enough to minimize the number of false positives.

In some implementations, the coverage analysis tool can also indicate the extent of the problem for problematic cells which can give network engineers or self-optimizing networks an indication of what cells to adjust first. For example, the coverage analysis tool can generate a report of cells flagged for corrective action with a priority indicator based on the number of over-shooter/under-shooter calls associated with the serving cell or extent of over-shooting/under-shooting associated with the serving cell.

In some implementations, the priority indicator can be based on the extent to which a first distance representing the distance from the serving cell to one or more neighbor cells differs from a second distance representing the distance from the serving cell to the geographic locations of the calls (e.g., the geographic locations of the mobile devices that placed or received the calls being analyzed). For example, a priority indicator indicating a higher priority can be used when the second distance is much larger than the first distance (e.g., when the degree of overshoot is very large) or when the second distance is much smaller than the first distance (e.g., the actual coverage is much smaller than the designed coverage).

In some implementations, the priority indicator can be based on the number of over-shooter or under-shooter calls per cell. For example, a serving cell with a higher number of overshooting or undershooting calls would have a priority indicator indicating a higher priority than a serving cell with a smaller number of over-shooting or under-shooting calls.

In some implementations, the coverage analysis tool can overlay a different visual treatment in a visual rendering of a network coverage map based on the priority indicator such that the visual treatment indicates the most problematic cells (e.g., bright red for cells with the largest number of over-shooter calls or furthest over-shooters and green for cells without any recommended coverage corrective action).

In some implementations, the prioritization of cells for corrective action as described above can be used to direct the priority of cells for self-optimization in a self-optimizing network (SON). For example, the coverage analysis tool can apply electrical down tilt to a serving cell serving the most over-shooter calls first before applying electrical down tilt on serving cells serving fewer over-shooter calls.

Figure 11:
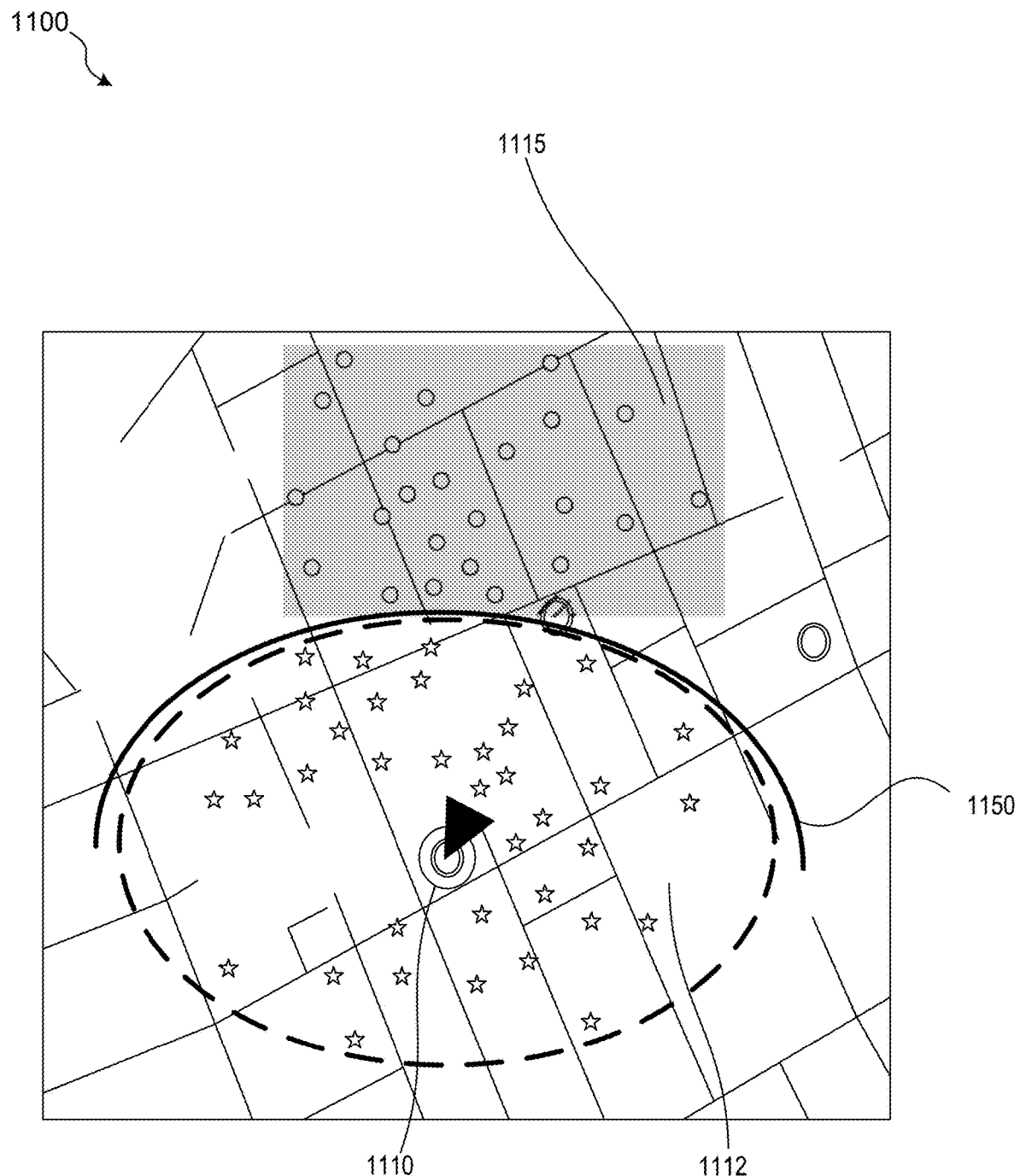
FIG. 11 is a map that illustrates a cellular network with over-shooter calls.

For example, turning to map 1100 in FIG. 11 which illustrates a cellular network with over-shooter calls, the coverage analysis tool at block 1040 can determine that source serving cell 1110 serves too many overshooting calls as seen in region 1115 which is beyond the arc 1150 which defines the first tier distance. Because the serving cell 1110 is serving calls in region 1115 which is beyond the design coverage area 1112, serving cell 1110 is an over-shooter cell. The coverage analysis tool can flag serving cell 1110 as a potential source of interference to cells also serving calls in region 1115. The coverage analysis tool can recommend serving cell 1110 for down tilt or power reduction as described above in relation to block 370 in FIG. 3. Once the network engineer has applied the recommended down tilt to the serving cell's antenna (or the coverage analysis tool has applied or caused to be applied an electrical down tilt), the automated coverage analysis is repeated to verify if there are additional over-shooter calls. The process is repeated until the network's coverage is optimized (e.g., the intended or designed coverage area matches the actual or computed coverage area).

Figure 12:
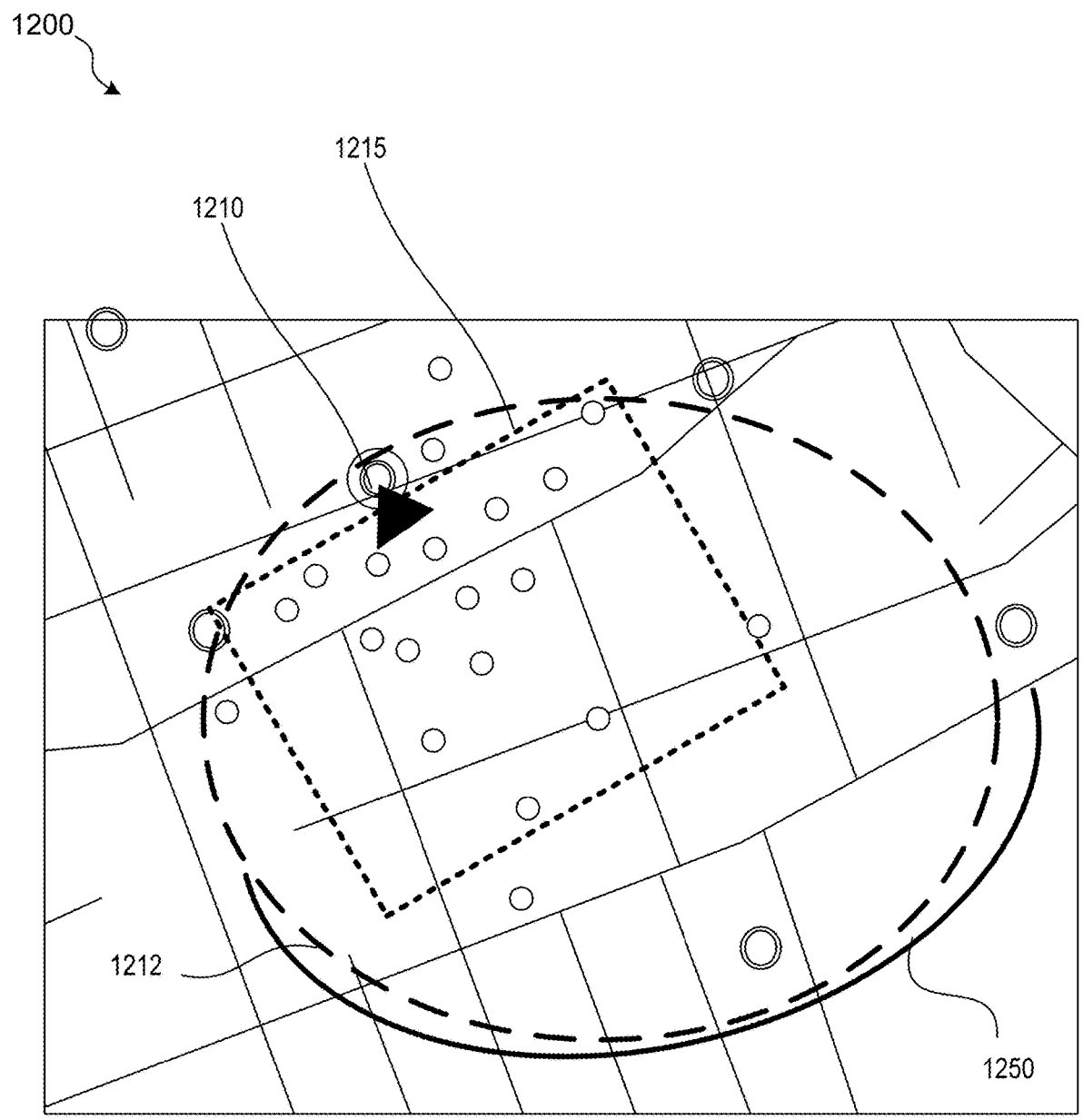
FIG. 12 is a map that illustrates a cellular network with under-shooter calls.

Turning to map 1200 in FIG. 12 which illustrates a cellular network with under-shooter calls, the coverage analysis tool at block 1040 can determine that source serving cell 1210 serves too many undershooting calls as seen in region 1215 which is contained within 50% of the first tier distance depicted by arc 1250. The coverage analysis tool can identify serving cell 1210 as a good candidate for up tilting or coverage expansion (e.g., increasing transmit power) because it is currently serving a high percentage of under-shooter calls relative to the total number of calls in the network and the coverage in the area is weak (e.g., weak coverage in the design area 1212 including in region 1215 containing under-shooter calls).

In some implementations, the coverage analysis tool can use TrueCall LSR data and be based on Python programming language. It will be appreciated, however, that the coverage analysis tool is independent on the source of call data or cellular network traffic information; is independent on the radio access technology (RAT), whether non-standalone (NSA) NR, standalone (SA) NR, EN-DC, LTE, UMTS, etc.; and, is independent on the frequency band that the serving cell is configured to operate on (e.g., low band like band n71 at 600 MHz, midband like band n41 at 2.5 GHz, or mmWave like band n260 at 39 GHz).

In some implementations, the coverage analysis tool at block 1040 can use additional criteria to determine over-shooter/under-shooter calls including the quality of the signal (e.g., RSRQ worse than −16), roaming or switching from NR to LTE which is an indication of a bad call quality in an NSA NR RAT, etc.

In addition to under-shooter/over-shooter optimization, the coverage analysis tool, with advanced analysis, can be used to identify areas where additional network elements need to be added for coverage enhancement (e.g., new sites, small cell deployments, etc.). In some implementations where vertical or elevation location data is available (e.g., smartphone barometer based elevation detection), the coverage analysis tool can assess if coverage in higher floors of buildings in an area is lacking and the cell can be tuned to cover the higher floors. For example, the coverage analysis tool can recommend an antenna up-tilt (or the network can automatically apply an electric up-tilt) where the serving cells is found to be serving lower floors but not higher floors as designed (better coverage in lower elevations). Conversely, the coverage analysis tool can recommend or cause to be applied an antenna down-tilt if the serving cell is serving higher floors but not lower floors (better coverage in higher elevations than in lower elevations, e.g., coverage in higher elevations meets a coverage goal but coverage in lower elevations does not meet a coverage goal where coverage goal can be RSRP, RSRQ, number of dropped calls, etc.).

In some implementations, the coverage in lower and higher elevations can be determined based on the computed first tier distance, the distance from the serving cell to the mobile device when the mobile device is on the ground, the elevation location data of the mobile device, and the signal strength of the mobile device. For example, if a mobile device on the ground floor is beyond the first tier distance but the signal strength is below a signal strength threshold, but a mobile device on the same latitude/longitude but on a higher floor has a signal strength above a signal strength threshold, this could indicate a need to optimize coverage in the higher floors (e.g., by down-tilting the sector antenna to reduce the higher-floor over-shooters).

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, any that may be listed in accompanying filing papers, and the assignee's concurrently filed U.S. patent application Ser. Nos. 11/469,259 and 17/469,462 respectively entitled COVERAGE IMPROVEMENT FOR 5G NEW RADIO WIRELESS COMMUNICATION NETWORK and COVERAGE IMPROVEMENT FOR 5G NEW RADIO WIRELESS COMMUNICATION NETWORK TO AUTOMATICALLY ADJUST CELL PROPERTIES TO IMPROVE COVERAGE AND CAPACITY, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium, carrying instructions, which, when executed by at least one data processor of a system, cause the system to:
   determine a first geographic location, an azimuth, and a beamwidth of a sector antenna of a serving cell in a cellular network;
   determine a second geographic location of a mobile device associated with a call served by the serving cell;
   determine a search area comprising an offset in degrees above and below the azimuth of the sector antenna;
   determine whether there is a first neighbor cell in the search area;
   add the first neighbor cell to a list of eligible neighbor cells in response to determining that there is the first neighbor cell in the search area;
   in response to determining that there is no first neighbor cell in the search area, determine an expanded search area by expanding the search area by the offset in degrees above and below the azimuth of the sector antenna,
      wherein the expanded search area comprises an area that is less than or equal to the beamwidth of the sector antenna;
   determine whether there is a second neighbor cell in the expanded search area;
   add the second neighbor cell to the list of eligible neighbor cells in response to determining that there is the second neighbor cell in the expanded search area;
   determine a first distance comprising an average distance from the serving cell to one or more closest neighbor cells in the list of eligible neighbor cells, wherein the first distance is determined based on the first geographic location and a geographic location of each of the closet neighbor cells;
   determine a second distance comprising a distance from the serving cell to the mobile device, wherein the second distance is determined based on the first and second geographic locations;
   when the search area is approximately equal to the beamwidth and no cells have been identified in the search area, so that the list of eligible neighbor cells is empty, determine a default inter-site distance;
   determine that the serving cell is an over-shooter cell when the second distance is larger than the first distance or when the second distance is larger than the default inter-site distance; and,
   automatically apply or cause to be automatically applied an electrical down-tilt or a decrease of a transmit power in response to determining that the serving cell is an over-shooter cell.

2. The at least one computer-readable storage medium of claim 1, wherein a number of the one or more closest neighbor cells is based on a density of cells in the cellular network.

3. The at least one computer-readable storage medium of claim 1, wherein the one or more closest neighbor cells is determined based on a number of handovers or handover attempts between the serving cell and each cell in the list of eligible neighbor cells.

4. The at least one computer-readable storage medium of claim 1, wherein the system is further caused to determine a priority indicator associated with the serving cell, wherein the priority indicator indicates the extent to which the second distance is larger than the first distance.

5. The at least one computer-readable storage medium of claim 1, wherein a degree of the electrical down-tilt or an amount of the decrease of the transmit power is selected to cause an actual coverage of the serving cell to match a designed coverage of the serving cell.

6. The at least one computer-readable storage medium of claim 1, wherein the system is further caused to:
determine an elevation location data of the mobile device;
determine a coverage in a lower elevation and a coverage in a higher elevation based on the elevation location data, the first distance, the second distance, and a signal strength of the mobile device; and
determine whether to apply an antenna down-tilt or up-tilt based on the coverage in the lower elevation and the coverage in the higher elevation.

7. A method comprising:
determining a first geographic location, an azimuth, and a beamwidth of a sector antenna of a serving cell in a cellular network;
determining a second geographic location of a mobile device associated with a call served by the serving cell;
determining a search area comprising an offset in degrees above and below the azimuth of the sector antenna;
determining whether there is a first neighbor cell in the search area;
adding the first neighbor cell to a list of eligible neighbor cells in response to determining that there is the first neighbor cell in the search area;
determining whether there is a second neighbor cell in an expanded search area;
adding the second neighbor cell to the list of eligible neighbor cells in response to determining that there is the second neighbor cell in the expanded search area;
determining a first distance comprising an average distance from the serving cell to one or more closest neighbor cells in the list of eligible neighbor cells, wherein the first distance is determined based on the first geographic location and a geographic location of each of the closest neighbor cells;
determining a second distance comprising a distance from the serving cell to the mobile device, wherein the second distance is determined based on the first and second geographic locations;
when the search area is approximately equal to the beamwidth and no cells have been identified in the search area, so that the list of eligible neighbor cells is empty, determining a default inter-site distance;
determining that the serving cell is an over-shooter cell when the second distance is larger than the first distance or when the second distance is larger than the default inter-site distance; and,
automatically applying or causing to be automatically applied an electrical down-tilt or a decrease of a transmit power in response to determining that the serving cell is an over-shooter cell.

8. The method of claim 7, wherein a number of the one or more closest neighbor cells is based on a density of cells in the cellular network.

9. The method of claim 7, wherein the one or more closest neighbor cells is determined based on a number of handovers or handover attempts between the serving cell and each cell in the list of eligible neighbor cells.

10. The method of claim 7, further comprising determining a priority indicator associated with the serving cell, wherein the priority indicator indicates the extent to which the second distance is larger than the first distance.

11. The method of claim 7, wherein a degree of the electrical down-tilt or an amount of the decrease of the transmit power is selected to cause an actual coverage of the serving cell to match a designed coverage of the serving cell.

12. A system comprising:
at least one hardware processor; and
at least one non-transitory memory, coupled to the at least one hardware processor and storing instructions, which, when executed by the at least one hardware processor, cause the system to:
determine a first geographic location, an azimuth, and a beamwidth of a sector antenna of a serving cell in a cellular network;
determine a second geographic location of a mobile device associated with a call served by the serving cell;
determine a first distance comprising an average distance from the serving cell to one or more closest neighbor cells in a list of eligible neighbor cells, wherein the first distance is determined based on the first geographic location and a geographic location of each of the closet neighbor cells;
determine a second distance comprising a distance from the serving cell to the mobile device, wherein the second distance is determined based on the first and second geographic locations;
when the search area is approximately equal to the beamwidth and no cells have been identified in the search area, so that the list of eligible neighbor cells is empty, determine a default inter-site distance;
determine that the serving cell is an over-shooter cell when the second distance is larger than the first distance or when the second distance is larger than the default inter-site distance; and,
automatically apply or cause to be automatically applied an electrical down-tilt or a decrease of a transmit power in response to determining that the serving cell is an over-shooter cell.

13. The system of claim 12, wherein a number of the one or more closest neighbor cells is based on a density of cells in the cellular network.

14. The system of claim 12, wherein the one or more closest neighbor cells is determined based on a number of handovers or handover attempts between the serving cell and each cell in the list of eligible neighbor cells.

15. The system of claim 12, wherein the system is further caused to determine a priority indicator associated with the serving cell, wherein the priority indicator indicates the extent to which the second distance is larger than the first distance.

* * * * *